United States Patent [19]
Wendt

[11] 3,889,988
[45] June 17, 1975

[54] PLASTIC ORIFICE INLET EXTENSION MEANS

[75] Inventor: Michael E. Wendt, Tyler, Tex.

[73] Assignee: General Electric Company, Louisville, Ky.

[22] Filed: Jan. 11, 1974

[21] Appl. No.: 432,496

[52] U.S. Cl. ................................. 285/239; 285/319
[51] Int. Cl. ............................................. F16l 33/00
[58] Field of Search........ 285/DIG. 9, DIG. 22, 234, 285/319, 187, 423, 174, 7

[56] References Cited
UNITED STATES PATENTS

| | | |
|---|---|---|
| 2,973,972 | 3/1961 | Baumen .................................. 285/7 |
| 3,264,013 | 8/1966 | Richardson et al................... 285/22 |
| 3,695,643 | 10/1972 | Schmunk ............................. 285/423 |
| 3,727,949 | 4/1973 | Kleykomp............................ 285/239 |

FOREIGN PATENTS OR APPLICATIONS 1,071,978  6/1967  United Kingdom................ 285/314

*Primary Examiner*—Dave W. Arola

[57] ABSTRACT

An apparatus is provided for extending a fan orifice flange member. The apparatus comprises an extension member which includes means that distort and place the extension member in tension when it is in a latched position on the flange. This arrangement is effective in maintaining the extension member in its latched position on the flange when one of the members expand relative to the other.

3 Claims, 5 Drawing Figures

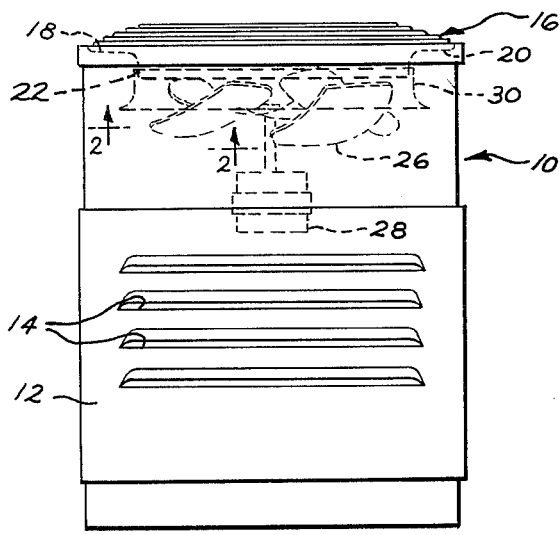
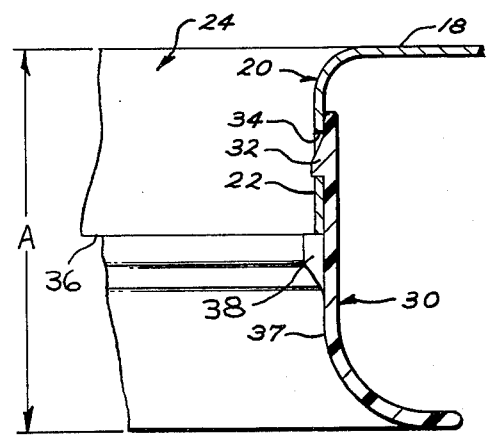
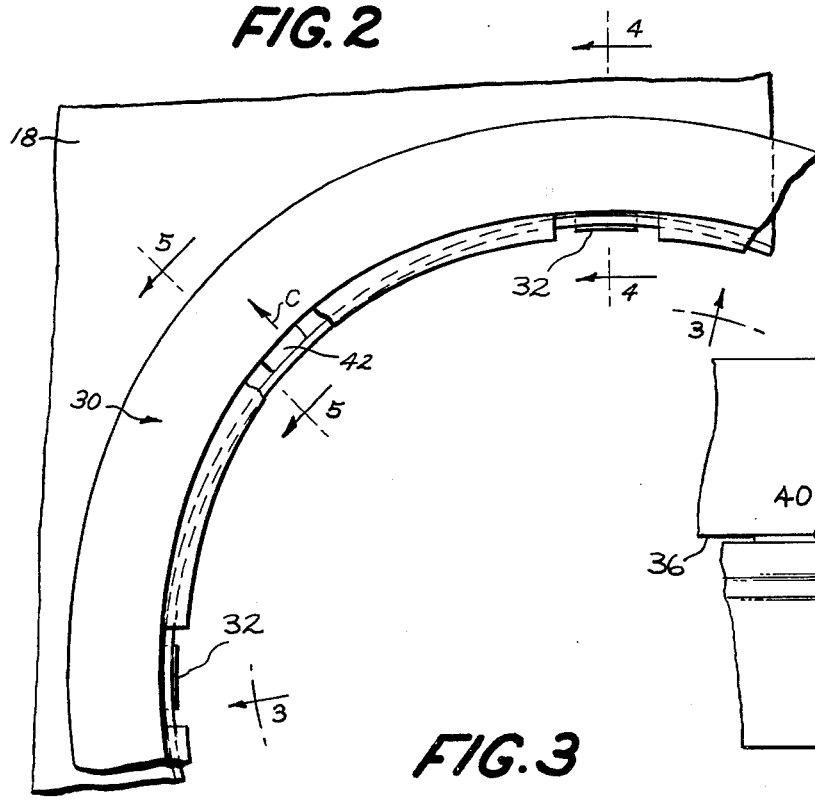
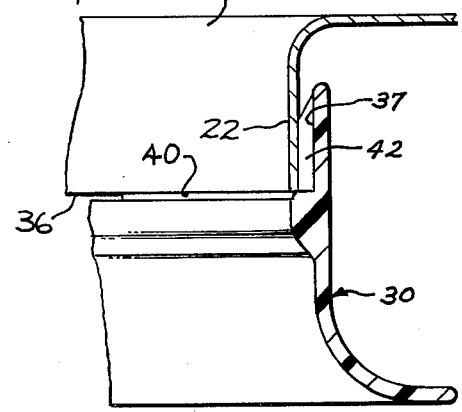
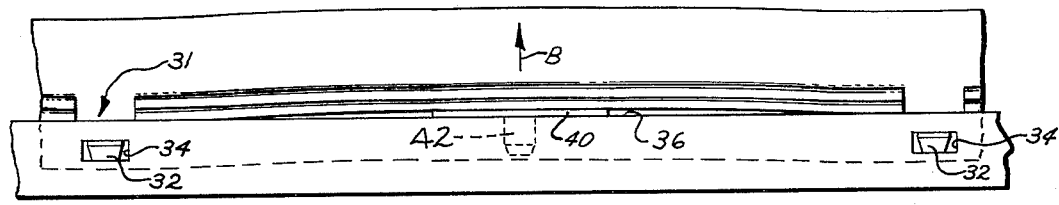

3,889,988

PLASTIC ORIFICE INLET EXTENSION MEANS

BACKGROUND OF THE INVENTION

1. Field of Invention

This invention relates generally to an apparatus for extending a flange member encompassing a fan orifice and more particularly to an extension member that is mounted and latched to the flange.

As is customary in fabricating a fan orifice from sheet metal material the flange member forming the orifice is usually formed in a support frame or dividing wall that separates the inlet and outlet portion. The depth of the flange is determined in part by the size of the orifice required and the thickness of the metal, as a result in many instances, the flange depth is not dimensioned to permit maximum or optimum air flow. The present invention provides an economical plastic extension member that is latched to the flange to extend it to a proper design configuration to provide efficient air flow through the fan orifice.

When the extension member is used in conjunction with the outdoor portion of a central air conditioning system, it is subjected to a wide range of ambient temperatures. The latching arrangement in accordance with the present invention provides means that place the extension member in tension both in a radial and axial direction so that it is maintained in its latched position during the wide range of ambient temperatures that cause the expansion and/or contraction of one member relative to the other.

2. Description of Prior Art

In the manufacture of air moving devices it is customary that the dividing wall on which the fan orifice is formed be dimensioned to be applied on units having different air flow requirements. As a result the commonly formed flange does not provide suitable air flow and noise level characteristics for all applications. While the metal divider wall may be drawn to provide a flange that would be suitable to a plurality of air flow and noise level requirement, the metal in the usual mass production manufacturing operation cannot be drawn to fit all air flow and noise level requirements. An approach used has been to provide separate drawing operations for each air flow and noise level requirement which results in the duplication of relatively expensive machinery and further creates a storage and handling problem. It should also be noted as mentioned herein above the depth of the flange is determined by the size of the desired orifice and the thickness of the metal used in the fabrication of the divider wall. The maximum depth capable of being drawn in some applications has been below the design dimension that would provide maximum air flow and noise level required.

SUMMARY OF THE INVENTION

By this invention there is provided a fan orifice arranged in a dividing wall that has a flange member formed integral with the wall and extends circumferentially around the orifice. An extension member which may have a coefficient of expansion different than the flange member is mounted and latched on the flange to thereby extend the flange to a predetermined design dimension. The extension member is provided with means that distort the extension member both in an axial and radial direction to place the extension member in tension when it is latched to the flange for maintaining the extension member in a latched position when one of the members may expand relative to the other due to changing ambient temperatures.

DESCRIPTION OF THE DRAWINGS

FIG. 1 is a side elevational view of a housing incorporating the preferred embodiment of the present invention;

FIG. 2 is a fragmentary view taken along lines 2—2 of FIG. 1 with parts broken away;

FIG. 3 is an elevational view taken along lines 3—3 of FIG. 2 showing the axial dimension of the parts;

FIG. 4 is a sectional view taken along line 4—4 of FIG. 2 showing the axial distortion of one part relative to the other; and FIG. 5 is a sectional view taken along lines 5—5 of FIG. 2 showing the radial distortion of one part relative to the other.

DESCRIPTION OF THE PREFERRED EMBODIMENTS

Referring now to the drawing and particularly to FIG. 1 thereof, there is illustrated an outdoor cabinet 10 of an outside section of a central air conditioner. The cabinet 10 generally includes a machine portion 12 which may contain appropriate air inlets 14 and an air outlet 16. The air inlet 14 and machine portion 12 are separated from the air outlet 16 by a dividing wall or partition 18.

A flange 20 is formed integral with the partition 18 to provide an axial disposed wall 22 encompassing a fan orifice 24. A fan 26 driven by a motor 28 is positioned in the orifice 24 so as to direct air entering through air inlet 14 in the machine portion 12 of cabinet 10 and over appropriate components (not shown) and out through outlet 16. In mass production manufacturing operations it is advantageous that units having similar parts be designed for maximum standardization, the partition 18 therefore is dimensioned to be employed in a number of cabinet designs. As mentioned hereinbefore the flange 20 is formed integral with the partition 18 and as a result the axial dimensions of the circumferentially disposed wall 22 is limited by the size of the orifice, the thickness of metal and other manufacturing considerations, rather than air flow or noise level design considerations of the particular application and as a result may not be dimensioned to provide maximum air flow efficiency.

In order to attain maximum air flow efficiency through the orifice 24 and to maintain noise level within design parameters it is necessary to provide an air orifice having a depth or axial dimension indicated by letter A FIG. 4 that is within certain design dimensions relative to the depth of the fan to be used in a particular application. To this end, by the present invention there is provided an extension member 30 which as seen in FIGS. 4 and 5 is arranged to be latched to the flange 20. An appropriately designed extension member 30 is provided for each fan depth size used so as to provide the axial dimension of the fan orifice 24 that permits maximum air flow efficiency and noise level for the fan size used in a particular installation. In the illustrated embodiment of the present invention the latching of the extension member 30 to the flange 20 is accomplished by the utilization of latching means 31 which comprise a tab 32 formed integral with the extension member 30 and corresponding slot means 34 provided in the wall portion 22 of flange 20. While in the present embodiment four tabs 32 and corresponding slot means 34 are spaced circumferentially around the fan orifice 24 it should be understood that any number of tabs and cooperating slots may be employed.

As shown in FIG. 4, the axially disposed circumferential free end 36 of the flange 20 engages a lip or projection 38 formed circumferentially along the inner wall 37 of the member 30. In the latched position the flange 20 is held firmly against axial movement between the lip 38 and the tab 32 engaging the end of slot 34 with the circumferential end 36 of flange 20 firmly held against the lip 38.

The outdoor unit or portion of a central air conditioning system (not shown) that is housed in cabinet 10 is subjected to a wide range of ambient temperatures that may vary for example from a low of approximately 35° below zero to a high of 140°F and it is therefore necessary to provide means that maintain the plastic extension member 30 securely attached to the metal flange member 20 during the extreme temperature conditions. The flange 20 as mentioned hereinbefore is formed from the sheet metal partition 18, while the extension member 30 in the present embodiment is conveniently fabricated from a plastic material such as Polycarbonate which has a higher coefficient of expansion than the sheet metal flange 20. The different coefficient of expansion between the sheet metal flange 20 and the plastic extension member 30 will under certain temperature conditions cause the extension member 30 due to its higher coefficient of expansion relative to the flange 20 to expand to a dimension that will permit the tabs 32 to disengage from the slots 34 thereby unlatching the member 30 from the flange 20.

By the present invention there is provided means for maintaining the tab 32 of the extension member 30 in its latched position in the slot 34 of the flange 20 during the above mentioned extreme temperature variations and the resultant expansion of the plastic extension member 30 relative to the metal flange 20. The means provided in the present embodiment for maintaining the member 30 in its latched relationship with the flange 20 are effective in placing the extension member 30 in tension both in an axial and direction as indicated by arrow B in FIG. 3 and in radial direction as indicated by Arrow C in FIG. 2. As will hereinafter be explained in detail during the expansion of the member 30 relative to the flange 20 the tension between the parts 20 and 30 is relaxed and the tab 32 will remain in engagement with the slot means 34 while contact between the lip 38 and end 36 will be maintained.

As best shown in FIG. 3 the means provided to maintain the extension memkber 30 in tension in the axial direction comprise projections 40 which are formed on the lip 38 between the latch members 32 and 34. During the installation of the extension member 30 to the flange 20 the projection 40 engages the end portion 36 of flange 20 at which time the continued movement of member 30 causes a distortion or an axial movement in the area of latch means 31 until the lip 38 engages the end portion 36 adjacent the latch means 31 at which time the tab 32 enters slot 34 to latch member 30 to flange 20. As can readily by understood the member 30 is thereby held in tension by the action of projection 40 on the end portion 36 between adjacent latching means 31.

As best shown in FIGS. 2 and 5 the means provided to maintain the extension member 30 in tension in the radial direction comprise cam means 42 which are formed on the inner wall 37 of member 30 adjacent the projection 40. During the installation of the extension member 30 to the flange 20 the cam means 42 engages the outer surface of wall 22 to circumferentially distort the wall 37 of member 30. Referring to FIG. 2 it will be seen that the flange 20 remains circular; however, the circumferentially disposed wall 37 of member 30 is distorted as it engages the outer surface of wall 22 in the area of the latching means 31 while it is maintained in a spaced relationship from wall 22 by cam means 42 between adjacent latching means. As can readily be understood the member 30 is thereby held in tension by the action of the caming means 42 between the wall 22 of flange 20 and the wall 37 of member 30 and as a result is distorted axially between adjacent latching means.

In summary the above described embodiment of the present invention will maintain the member 30 securely latched to the flange 20 during the extreme ambient temperature that it may be subjected to. As the plastic member 30 expands relative to the metal flange 20 the tension between the member 30 and flange 20 caused by the projections 40 and cam means 42 is relaxed. However, the relative expansion of member 30 over a broad range of ambient temperatures will not be sufficient to cause disengagement of the tabs 32 from the slots 34.

While in accordance with the Patent Statutes, there has been described what, at present, is considered to be the preferred embodiment of the invention, it will be obvious to those skilled in the art that various changes and modifications may be made thereto without departing from the invention, and it is intended therefore in the appended claims to cover all such changes and modifications as fall within the true spirit and scope of the invention.

I claim:

1. A fan orifice means arranged in a dividing wall comprising:

a flange member formed integral with said wall and extending axially therefrom to provide a radial surface circumferentially disposed around said orifice;

an extension member of dissimilar coefficient of expansion than said flange member including a radial wall having a portion telescopically arranged on said radial surface for axially extending said fan orifice;

a lip on one of said members defining a plane perpendicular to the central axis of said orifice engaging the other of said member thereby axially positioning said extension memkber on said flange member;

latching means including tab means spaced circumferentially on one of said members engaging slot means on the other of said members thereby maintaining the other of said members in engagement with said lip in said plane;

a plurality of circumferentially spaced projections extending longitudinally from said plane on one of said members intermediate said latching means being interposed between said lip and the other of said members axially holding a portion of said extension member longitudinally out of said plane a distance sufficient to axially distort said portion of said extension member relative to said plane and place said extension member in axial tension;

a plurality of cam means spaced circumferentially on one of said members projecting between said radial wall and said radial surface radially spacing a portion of said radial wall from said radial surface a distance sufficient to cause the other portion of said radial wall into forceable contact with said radial surface thereby radially distorting said extension member relative to said flange member and placing said extension member in radial tension whereby said extension member is held in tension radially and axially relative to said flange member to maintain said latching means engaged during expansion of one of the members relative to the other.

2. A fan orifice means arranged in a dividing wall comprising:

a flange member formed integral with said wall and extending axially therefrom to provide a radial surface circumferentially disposed around said orifice;

an extension member of dissimilar coefficient of expansion than said flange member including a radial wall having a portion telescopically arranged on said radial surface for axially extending said fan orifice;

a circumferentially disposed lip on one of said members defining a plane perpendicular to the central axis of said orifice engaging the axially disposed free end of said radial surface thereby axially positioning said extension member on said flange member;

latching means including tab means spaced circumferentially on one of said members engaging slot means on the other of said members thereby maintaining the other of said members in engagement with said lip in said plane;

a plurality of circumferentially spaced projections on said lip extending longitudinally from said plane intermediate said latching means engaging said axially disposed free end of said radial surface thereby axially holding a portion of said extension member longitudinally out of said plane a distance sufficient to axially distort said portion of said extension member relative to said plane and place said extension member in axial tension;

a plurality of cam means spaced circumferentially on one of said members projecting between said radial wall and said radial surface radially spacing a portion of said radial wall from said radial surface a distance sufficient to cause the other portion of said radial wall into forceable contact with said radial surface to radially distort said extension member relative to said flange member and place said extension member in radial tension whereby said extension member is held in tension radially and axially relative to said flange member to maintain said latching means engaged during expansion of one of the members relative to the other.

3. A fan orifice according to claim 2 wherein:

said circumferentially disposed lip extends from the radial wall of said extension member into axial alignment with the axially disposed end of said radial surface; and said cam means project from the radial wall and engage said axially disposed end of said radial surface during telescoping of said members for forcing and radially spacing portions of said radial wall relative to said radial surface a distance sufficient to cause the other portion of said radial wall to forceably engage said radial surface.

* * * * *